June 2, 1970   B. L. FOWLER   3,515,221
SCRAPER BLADE ATTACHMENT FOR TRACTORS

Filed May 9, 1967   5 Sheets-Sheet 1

INVENTOR
BYRON LEO FOWLER

BY   *B. P. Fishburn, Jr.*

ATTORNEY

June 2, 1970 B. L. FOWLER 3,515,221
SCRAPER BLADE ATTACHMENT FOR TRACTORS
Filed May 9, 1967 5 Sheets-Sheet 2

INVENTOR
BYRON LEO FOWLER

BY *B.P. Fishelman, J.*
ATTORNEY

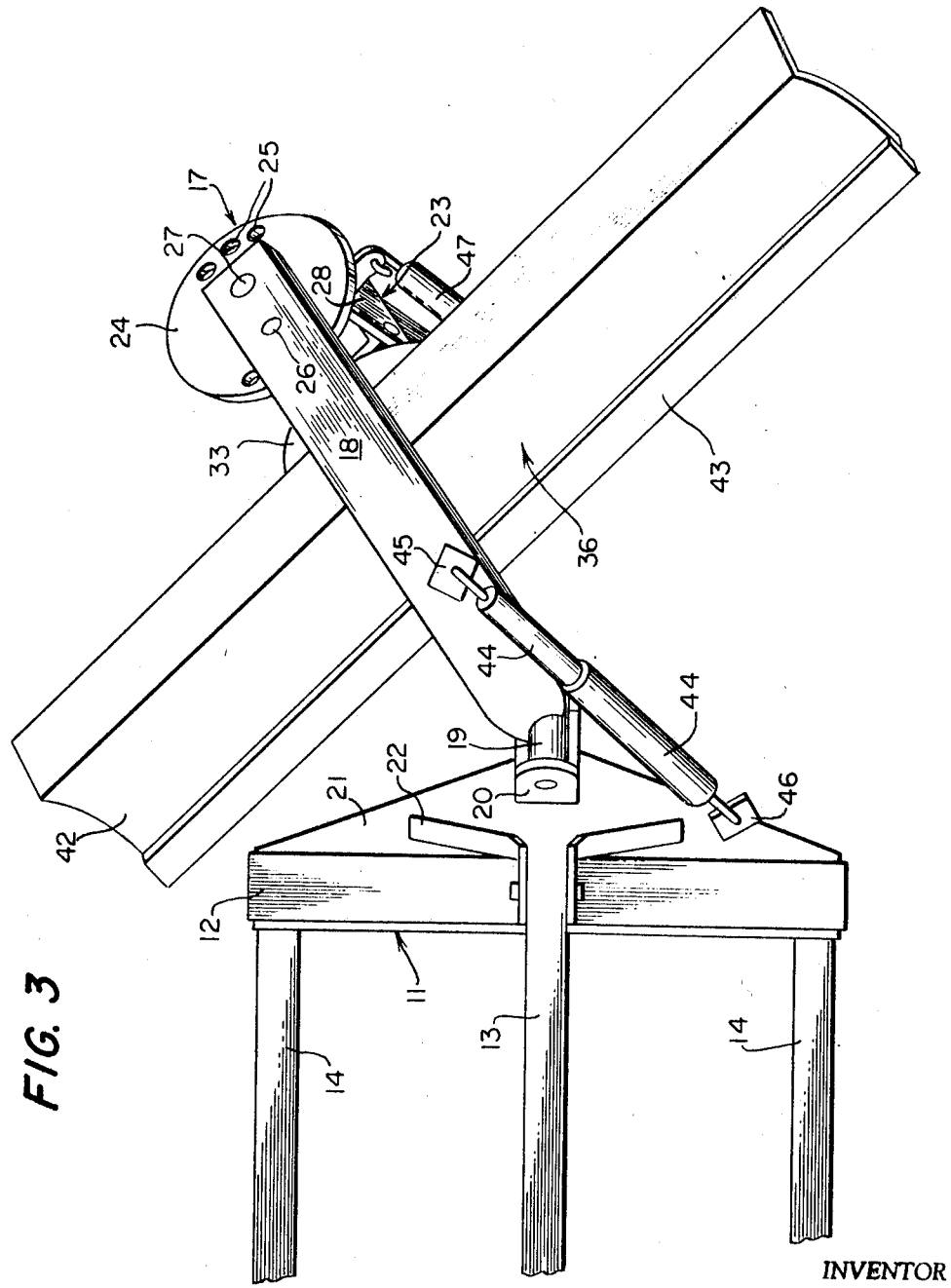

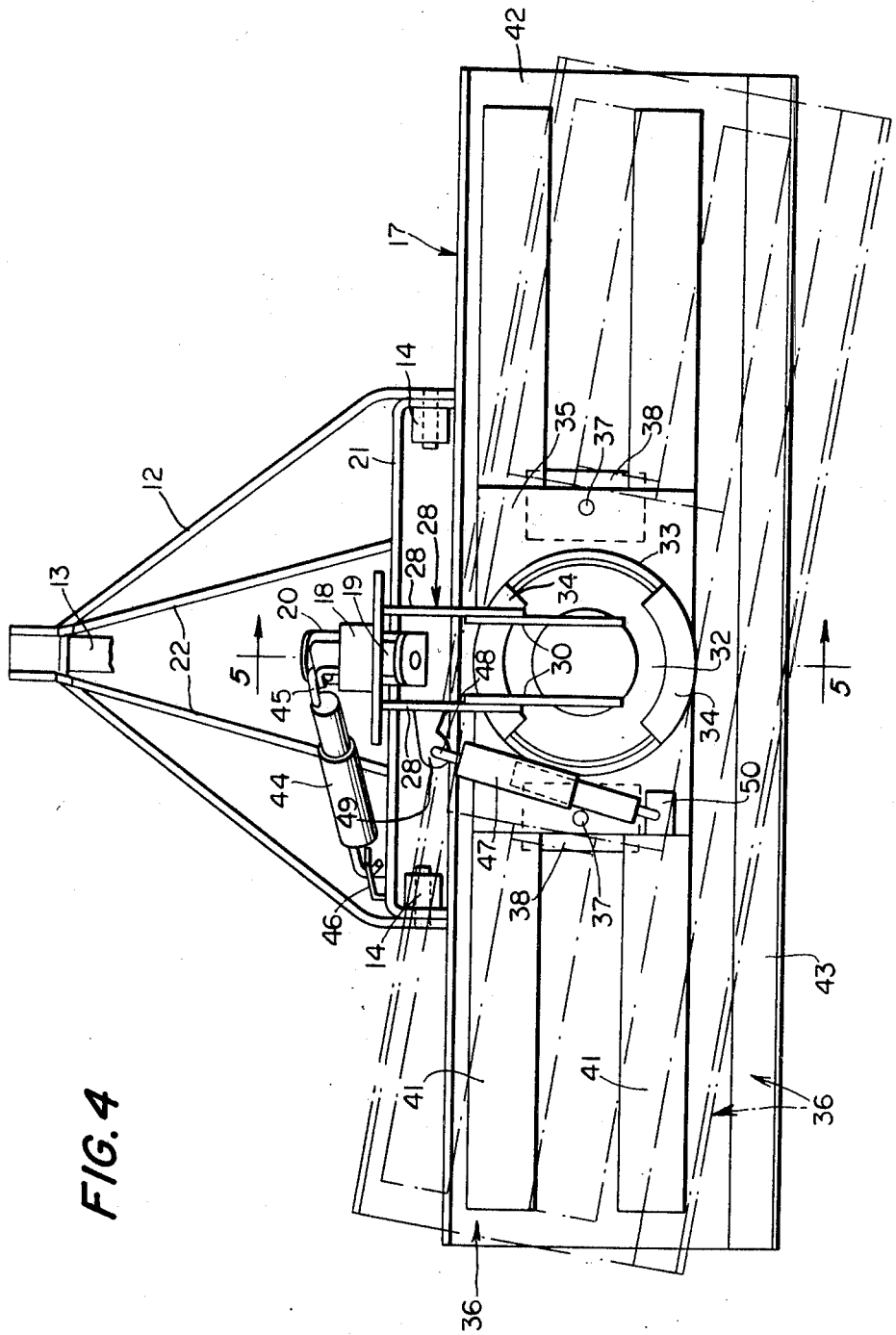

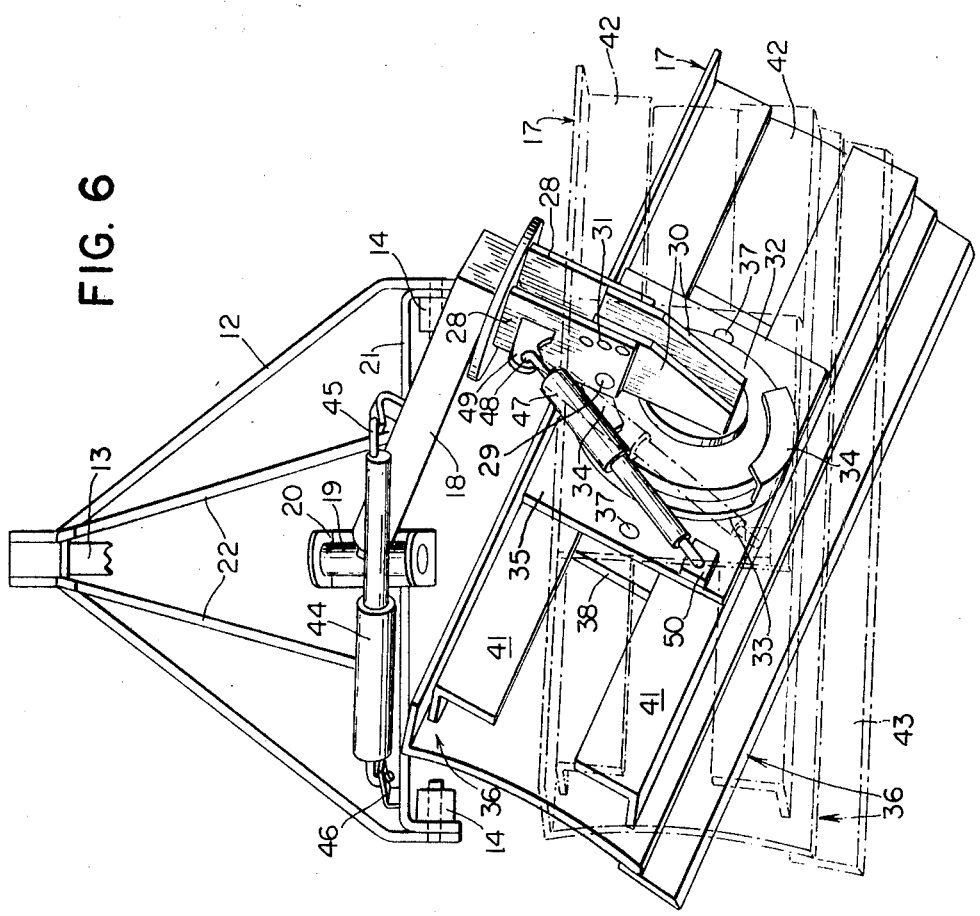

United States Patent Office 3,515,221
Patented June 2, 1970

3,515,221
SCRAPER BLADE ATTACHMENT FOR TRACTORS
Byron Leo Fowler, Corpus Christi, Tex., assignor to E. L. Caldwell & Sons, Inc., Corpus Christi, Tex., a corporation of Texas
Filed May 9, 1967, Ser. No. 637,266
Int. Cl. A01b 59/06
U.S. Cl. 172—447
9 Claims

ABSTRACT OF THE DISCLOSURE

A scraper blade assembly mountable upon a standard three-point tractor hitch and having power means operable from the seat of the tractor to adjust the scraper blade to a number of different working positions either offset laterally of the tractor or directly therebehind.

BACKGROUND OF THE INVENTION

The prior art discloses quite a number of tractor-mounted scraper blades, usually capable of being raised and lowered, adjusted angularly to the path of movement of the tractor and tilted upon a horizontal, longitudinal axis. Some of the adjustments of the blade are accomplished with power means including hydraulic means and some require the tractor driver to dismount in order to adjust the blade manually and lock it in the desired working position.

There has long been a need for a scraper blade or grader attachment for tractors which is essentially completely power-operated, preferably hydraulically, from the tractor seat, and wherein the scraper blade can be adjusted for level grading or ditch grading at various angles to the horizontal while the blade is directly behind the tractor or offset laterally to either side of the tractor.

The prior art does not propose a scraper blade attachment for tractors having all of the above capabilities and it is the purpose of the invention to provide such an attachment or assembly which may be power-operated and which is capable of greatly increased flexibility of usage and operational positions without the necessity of the tractor driver leaving his seat.

SUMMARY OF THE INVENTION

The invention scraper blade attachment mounts bodily on the tractor three-point hitch and may be raised and lowered. It includes a primary support arm which may be swung by power means to the left or right of the tractor and the arm turns on a pivot which is inclined to the vertical by an acute angle. Therefore, when the arm is swung laterally in either direction, the scraper blade carried by it is automatically tilted. In conjunction with this, there is a separate power means connected with the blade to change the angle of tilt at any time so that the blade may be leveled or adjusted to grade the sides of a ditch or the like. The blade may also be shifted bodily laterally on its mounting by a unique support track means and may also be tilted forwardly or rearwardly on another transverse horizontal pivot to vary its angle of incidence to the ground. The blade holder and blade may also be swung or turned on a vertical pivot axis near the rear end of the support arm, either by power means or by manual adjustment, if preferred.

BRIEF DESCRIPTION OF THE DRAWINGS

FIG. 3 is another plan view of the invention illustrating the swinging of the blade laterally to the right or left of the tractor on an inclined pivot to effect automatic tilting of the blade;

FIG. 4 is a rear elevational view of the invention illustrating further adjustability thereof;

FIG. 5 is an enlarged vertical section taken on line 5—5 of FIG. 4; and

FIG. 6 is a rear elevation showing the scraper attachment in a laterally offset position, as in FIG. 3.

DESCRIPTION OF THE PREFERRED EMBODIMENT

Figure 1:
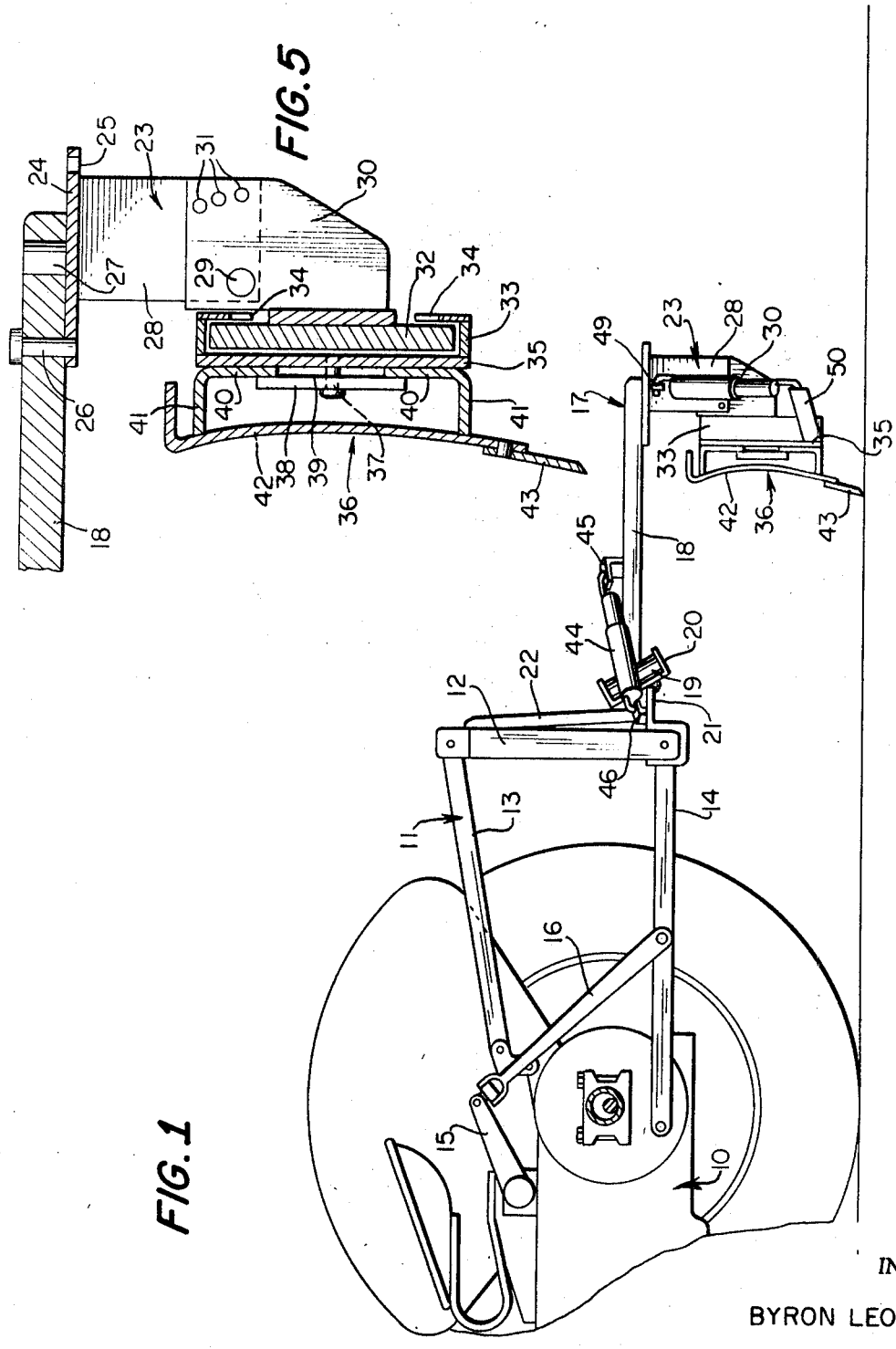
FIG. 1 is a side elevation of a tractor-mounted scraper attachment embodying the invention.

Referring to the drawings, wherein like numerals designate like parts, the numeral 10 designates a conventional farm tractor having the well known three-point hitch 11 for supporting various implements at the rear of the tractor. The hitch 11 includes the usual A-frame 12 pivoted to upper and lower arms 13 and 14. The hitch structure and the implement carried thereby are conventionally raised and lowered by the standard hydraulic lift mechanism 15 of the tractor, connected with suitable pull links 16. All of this construction is standard and well known in the art.

The invention proper is indicated in its entirety at 17 and comprises a primary generally horizontal rigid support arm 18 extending rearwardly of the tractor hitch and having its forward end secured by welding or the like to an inclined pivot element or pin 19. The axis of the pivot element 19 is preferably at forty-five degrees to the vertical and horizontal although the angle may be varied somewhat within the invention. The pivot element 19 is held rotatably within a bracket 20 which in turn is rigidly secured by welding or the like to a plate 21 or ledge on the bottom of the A-frame 12. The ledge 21 is preferably reinforced by upstanding braces 22 welded thereto, as indicated, and having their tops connected with the top of the A-frame. The support arm 18 is thus bodily mounted on the tractor hitch through the medium of bracket 20 and inclined axis pivot element 19.

A moldboard bracket or holder 23 is dependingly secured pivotally at the rear end of the arm 18 and includes a top indexing plate 24 rigid therewith having a circular group of adjusting holes 25 formed therethrough for the selective reception of an adjusting or index pin 26 near the rear end of the arm 18. The plate 24 has an upstanding pivot element 27 rigidly secured thereto which engages rotatably within an opening formed in the rear end of the arm 18. As shown in the drawings, the moldboard bracket or holder 23 is adjusted or indexed circumferentially by applying the pin 26 through any chosen one of the openings 25 and this will fix the angle of the scraper blade with respect to the direction of movement of the tractor. However, if preferred, the pin 26 could be omitted and the turning of the bracket 23 and plate 24 could be accomplished by power means, such as an extensible and retractable hydraulic cylinder-piston unit having one end secured to the arm 18 and another end secured to the plate 24 or a radial extension thereof. As shown in the drawings, the turning of the bracket 23 and plate 24 is performed manually because this particular adjustment of the implement does not have to be frequently made, like the raising and lowering, swinging from side-to-side laterally or blade tilting operations, which are all done with power means.

The bracket 23 includes two spaced vertical plates 28, as shown, pivotally connected near their lower ends through a horizontal pivot element 29 or elements with companion plate sections 30, each having an arcuate row of adjusting openings 31 to register with coacting openings in the plates 28 and receive a locking pin. In this manner, the plate sections 30 may be pivoted on the element 29 and locked in several different angularly adjusted positions so as to tilt the scraper blade forwardly or rearwardly and vary its angle of incidence with the ground. This is another adjustment which may be manual because the need for adjustment does not occur frequently.

The forward edges of plate sections 30 are welded or otherwise rigidly secured to a vertically disposed circular disc or head 32 which is closely surrounded by a turnable ring member 33 having top and bottom retainer sections 34 which are arcuate as shown in FIG. 4. The ring member 33 in turn is rigid with a rectangular vertical plate 35 which may turn with the ring member and the entire scraper blade 36 on the horizontal axis of the circular head 32 under influence of power means, to be described.

Near its opposite ends, the plate 35 carries bolts 37 or the like which engage forward guiding and clamp plates 38, spaced apart widely as shown in FIG. 4. Spacer elements 39, FIG. 5, are disposed between the clamp plates 38 and the larger plate 35 so as to form guide channels between these elements. These guide channels receive the vertical webs 40 of L-shaped horizontal track members 41 on the back of moldboard 42 or scraper blade body. The track members 41 may be welded to the back of the moldboard. The lower edge portion of the moldboard 42 carries the scraper blade extension 43, as shown. By loosening the bolts 37, the entire scraper blade may be shifted from side-to-side laterally relative to the head 32 and bracket 33 and therefore relative to the arm 18. When the bolts 37 are re-tightened, the blade is locked in the selected adjusted position.

Figure 2:
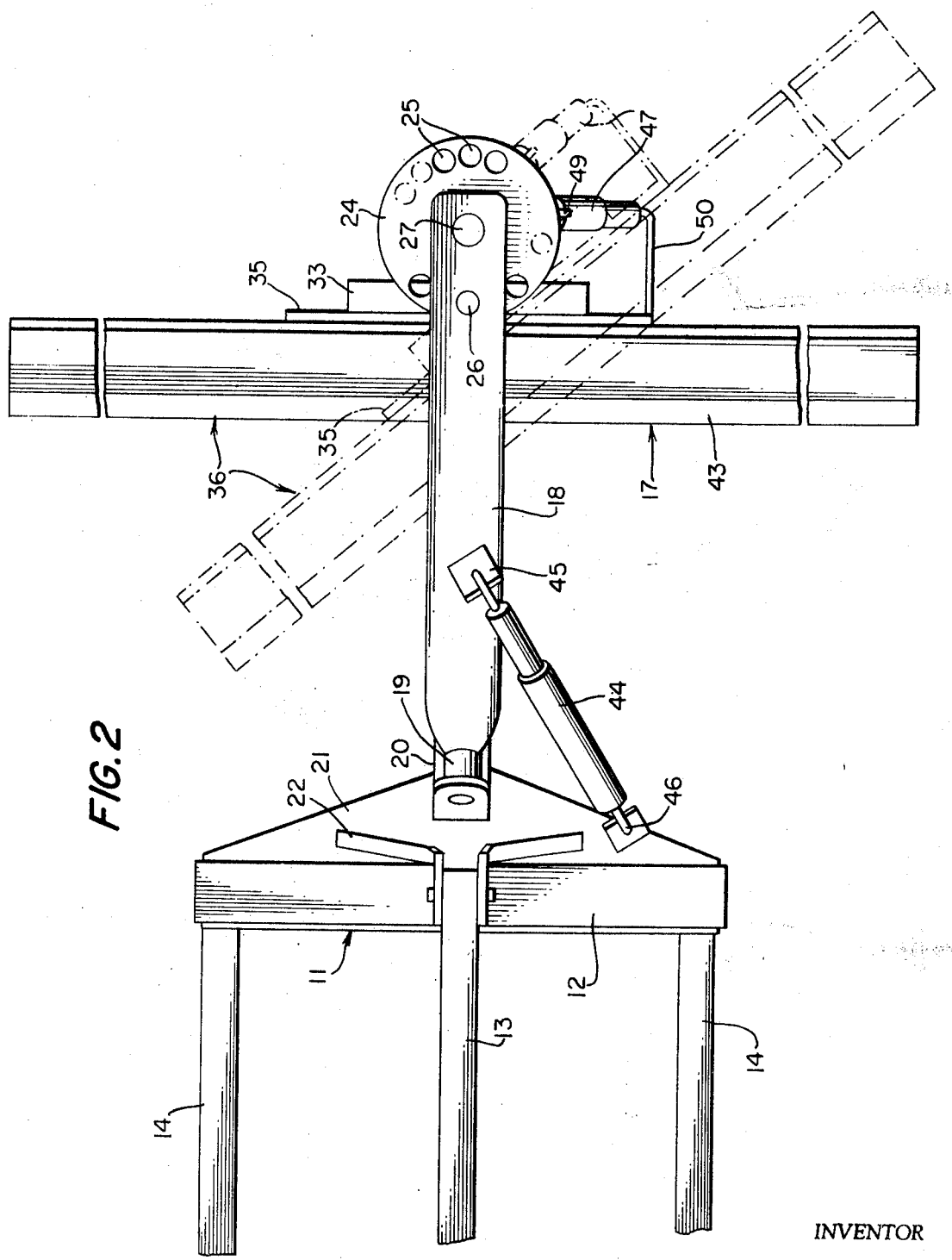
FIG. 2 is a plan view thereof on an enlarged scale.

As previously mentioned, power means are provided to effect the principal and most frequently needed adjustments of the scraper blade attachment. This means comprises a first extensible and retractable cylinder-piston unit 44 lying diagonally and generally horizontally between the arm 18 and the plate or ledge 21. One end of the unit 44 is attached as at 45 to the arm 18 while its opposite end is attached at 46 to the plate 21 near one side of the latter and spaced considerably to one side of the pivot 19. FIG. 2 shows the arm 18 in a central position with the power unit 44 in the intermediate condition. Referring to FIG. 3, the unit 44 is extended to swing the arm 18 to one side, as shown in full lines, and the unit 44 is retracted to swing the arm to the opposite side on the axis of the pivot element 19. The hydraulic connections for the power unit 44 may be conventional and need not be illustrated. The hydraulic unit may be pressurized and operated from the standard hydraulic system of the tractor, as is well known.

A second hydraulic cylinder-piston unit 47 is provided to tilt the scraper blade on the axis of the circular head 32 or to cause the ring member 33 and associated parts to revolve around the head 32 as depicted in broken lines in FIG. 4. The extensible and retractable unit 47 is generally vertical and has its upper end connected as at 48 with a bracket arm 49 rigidly secured to one of the vertical plates 28. The lower end of the unit 47 is similarly connected to a rigid bracket 50 projecting from the plate 35 or some other part of the scraper assembly which revolves about the circular head 32. The hydraulic unit 47 may be extended and retracted to swing either end of the scraper blade upwardly or downwardly, generally as depicted in FIG. 4. In this figure, the scraper blade is shown in full lines in a level position. The hydraulic connections for the unit 47 are conventional and have been omitted from the drawings for simplicity. Suitable conventional hydraulic controls for the units 44 and 47 are in ready reach of the tractor driver so that he can manipulate the scraper blade without leaving the tractor seat.

In view of the foregoing description, the use or operation of the invention attachment 17 is readily understood. The scraper blade attachment may be raised and lowered along with the tractor hitch by use of the standard power lift 15. As previously explained, the blade assembly can be tilted forwardly or rearwardly on the pivot 29 and locked in a number of adjusted positions. The blade can also be turned on the vertical pivot 27 and locked in a number of adjusted positions, as shown in dotted lines in FIGS. 2 and 3.

The power cylinder 44 is operated from the tractor seat to swing the arm 18 laterally in either direction from its central longitudinal position and the arm swings on the inclined pivot element 19. FIGS. 3 and 6 show the arm and scraper blade swung laterally to the right, as viewed from the rear of the implement. When this is done, as shown in FIGS. 3 and 6, the scraper blade 36 becomes automatically tilted from its center level position and its outermost end moves downwardly and also moves forwardly as shown in FIG. 3. The entire blade is now also offset to the right of the tractor and hitch mechanism and is no longer directly rearwardly thereof as when the arm 18 is level and on the center line of the hitch and tractor, FIG. 2. The inclined pivot 19 causes the arm 18 to swing in a compound arc to impart the automatic tilting movement to the blade 36. A comparison of FIGS. 4 and 6 shows clearly that when the arm 18 swings laterally in either direction on the inclined pivot 19, the entire scraper blade assembly moves downwardly relative to the A-frame 12, as well as being shifted laterally of the tractor and forwardly as shown in FIG. 3.

This movement of the blade with the arm 18 enables the blade to scrape or grade the near inclined side of a drainage ditch or the like along which the tractor is traveling. Additionally, when the arm 18 is swung in either direction away from center by the power unit 44, the independent power 47 may be extended or retracted at any desired time by the use of controls on the tractor to return the scraper blade 36 to a level position for level grading or to a different tilted position on the axis of rotation of the circular head 32. FIG. 6 shows the blade 36 in dotted lines returned by the unit 47 to a level condition while the blade remains offset or swung to the right with the arm 18. FIGS. 1, 2 and 4 show that when the arm 18 is centered, it is level and the scraper blade will be level although it may be tilted upwardly or downwardly at either end by means of the power unit 47.

It should be apparent that the implement possesses great flexibility of adjustment and the scraper blade 36 can assume a wide variety of positions for performing various grading operations including positions which cannot be achieved with prior art constructions. It is thought that the advantages of the invention and its utility should now be apparent to those skilled in the art without the necessity for any further description of the operation. The very essence of the invention is thought to reside in placing the arm 18 on the inclined pivot 19 to be swung in either direction from center by means of the unit 44, in conjunction with the second power unit 47 to adjust the tilting of the blade on the axis of the circular head 32 at any time and in all positions of the arm 18. It is this combination of elements which renders the blade attachment so highly useful and capable of performing so many different grading operations and scraping operations.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. A scraping and grading blade attachment for a tractor having a three-point hitch, said attachment comprising an implement frame adapted for connection with the tractor hitch and bodily carried thereby, a pivot element on the implement frame having a pivot axis which is inclined in a vertical plane in a forward direction with reference to forward movement of the tractor, a support arm having its forward end secured to the pivot element and being swingable on the inclined axis of the pivot element laterally in opposite directions from a center longitudinally extending position, a power device operable from the tractor seat connected with said arm to swing it laterally on the pivot element axis in either direction, and a scraper blade unit carried by said arm near its rear end and being bodily movable with the arm, the arm being approximately horizontal when in said center longitudinally extending position and the arm moving laterally outwardly and downwardly through a compound arc when swung by the power device in either direction on the inclined axis of the pivot element, such swinging movement of the arm in either direction causing the scraper blade unit to be tilted in such a manner that the outermost end of the blade unit is moved downwardly and forwardly relative to said implement frame and the entire blade unit is lowered relative to said frame.

2. A scraping and grading blade attachment for a tractor according to claim 1, and means including a second power device connected with said blade unit and operable from the tractor seat to tilt the blade unit upwardly or downwardly at either end thereof relative to the support arm in any adjusted position of the support arm.

3. A scraper blade attachment for tractors comprising a tractor mounted implement lift for raising and lowering the scraper blade attachment, an inclined axis pivot element mounted upon the implement lift, the pivot element lying in a vertical plane with its upper end being in advance of its lower end and the axis of the pivot element being at an acute angle to the vertical and horizontal, an elongated arm having its forward end secured to the pivot element, the arm forming an acute angle with the axis of the pivot element, a power device connected with the arm for swinging it in opposite directions on the inclined axis of the pivot element, the arm assuming a level position directly aft of the tractor when arranged in a central vertical longitudinal plane through the axis of the pivot element and the arm swinging in a compound arc on either side of the pivot element and having its rearward end lowered substantially with respect to the pivot element and implement lift when swung to either side, and a scraper blade carried by the rearward end of the arm bodily and moving therewith, whereby the scraper blade assumes a level transverse position when the arm is immediately aft of the tractor and the blade when swinging to either side of the pivot element with the arm is automatically tilted and has its outboard end arranged substantially below and substantially forward of its inboard end.

4. The structure of claim 3, and said power device comprising an extensible and retractable power cylinder unit interconnecting said lift and said arm.

5. The structure of claim 4, and the ends of said power cylinder unit connected with said lift at a point spaced from one side of the pivot element and connected with said arm at a point spaced rearwardly of the pivot element.

6. The structure of claim 3, and means supporting the scraper blade on said arm near the longitudinal center of the blade so that the blade can pivot on a substantially horizontal axis longitudinally of the tractor, and a second power device connected with the glade for causing it to pivot on said horizontal axis longitudinally of the tractor.

7. The structure of claim 6, and said means supporting the blade comprising a dependent bracket structure on the rear end of the arm, a horizontal longitudinal axis pivot element on the bracket structure near its lower end, and said blade pivoted to the last named pivot element substantially at the longitudinal center of the blade.

8. The structure of claim 7, and said bracket structure being a two-part structure, a transverse pivot element interconnecting said two parts and allowing the lower part and said blade to be tilted in opposite directions on the axis of said transverse pivot element, and detent means on said bracket parts for releasably securing the lower bracket part and blade in a number of selected tilted positions.

9. The structure of claim 8, and a vertical axis pivot element interconnecting the upper part of the bracket structure and said arm, whereby the entire bracket structure and said blade may be adjusted in either direction on said vertical axis pivot element.

References Cited

UNITED STATES PATENTS

| | | | |
|---|---|---|---|
| 2,309,750 | 2/1943 | Carrington | 172—447 |
| 2,822,628 | 2/1958 | Arps et al. | 172—447 |
| 3,038,268 | 6/1962 | Vivier | 172—793 |
| 3,195,249 | 7/1965 | Collins | 172—447 X |
| 3,411,467 | 11/1968 | Van Der Lely et al. | 111—54 |

FOREIGN PATENTS 203,667  9/1956  Australia.

ROBERT E. PULFREY, Primary Examiner

R. C. HARRINGTON, Assistant Examiner

U.S. Cl. X.R.

172—742